United States Patent
Anezaki

(10) Patent No.: US 10,404,883 B2
(45) Date of Patent: Sep. 3, 2019

(54) IMAGE READING APPARATUS AND IMAGE FORMING SYSTEM

(71) Applicant: Konica Minolta, Inc., Tokyo (JP)

(72) Inventor: Tsutomu Anezaki, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/902,602

(22) Filed: Feb. 22, 2018

(65) Prior Publication Data
US 2018/0262639 A1     Sep. 13, 2018

(30) Foreign Application Priority Data
Mar. 8, 2017    (JP) ................. 2017-043606

(51) Int. Cl.
*H04N 1/12*      (2006.01)
*H04N 1/00*      (2006.01)
*G03G 15/00*     (2006.01)

(52) U.S. Cl.
CPC ......... *H04N 1/121* (2013.01); *G03G 15/5054* (2013.01); *G03G 15/5062* (2013.01); *G03G 15/6573* (2013.01); *H04N 1/0057* (2013.01)

(58) Field of Classification Search
CPC ... H04N 1/121; H04N 1/0057; G03G 15/6573
See application file for complete search history.

(56) References Cited

U.S. PATENT DOCUMENTS

| | | | | |
|---|---|---|---|---|
| 5,157,520 A | * | 10/1992 | Tanaka | B65H 5/062 355/75 |
| 6,160,973 A | * | 12/2000 | Mui | G03G 15/6573 347/156 |
| 7,529,494 B2 | * | 5/2009 | Won | G03G 15/6552 399/400 |
| 2006/0263129 A1 | * | 11/2006 | Won | G03G 15/6552 399/405 |
| 2009/0189337 A1 | * | 7/2009 | Yamamoto | B65H 29/12 271/189 |
| 2010/0072692 A1 | * | 3/2010 | Iida | B65H 5/26 271/110 |

(Continued)

FOREIGN PATENT DOCUMENTS

CN         1866135 A     11/2006
CN      104418121 A      3/2015
(Continued)

OTHER PUBLICATIONS

Extended European Search Report dated Jul. 27, 2018 from corresponding European Application No. EP 18153216.9.
(Continued)

*Primary Examiner* — Ted W Barnes
(74) *Attorney, Agent, or Firm* — Lucas & Mercanti, LLP

(57) ABSTRACT

An image reading apparatus includes: a reader; a first conveyance roller pair; a second conveyance roller pair; and a hardware processor that lowers a conveying force exerted from the second conveyance roller pair on a sheet when acceleration control for accelerating a conveying speed of the sheet whose image has been read by the reader is performed, compared with a case in which the acceleration control is not performed.

23 Claims, 10 Drawing Sheets

(56) References Cited

U.S. PATENT DOCUMENTS

| | | | | |
|---|---|---|---|---|
| 2012/0104676 A1* | 5/2012 | Hatayama | ............... | B65H 5/062 |
| | | | | 271/3.2 |
| 2013/0294795 A1* | 11/2013 | Tamura | ............... | G03G 15/6555 |
| | | | | 399/82 |
| 2014/0292882 A1* | 10/2014 | Oizumi | ................ | B41J 13/0009 |
| | | | | 347/16 |
| 2015/0061209 A1* | 3/2015 | Hachisuga | ............. | B65H 15/00 |
| | | | | 271/3.19 |
| 2017/0085726 A1* | 3/2017 | Tominaga | .......... | H04N 1/00045 |
| 2018/0013906 A1* | 1/2018 | Sato | ................... | G03G 15/2053 |

FOREIGN PATENT DOCUMENTS

| | | |
|---|---|---|
| JP | H05-319656 A | 12/1993 |
| JP | 2003252477 A | 9/2003 |
| JP | 2004-184813 A | 7/2004 |
| JP | 2008-115011 A | 5/2008 |
| JP | 2010-070368 A | 4/2010 |
| JP | 2015-048189 A | 3/2015 |
| JP | 2016-191779 A | 11/2016 |

OTHER PUBLICATIONS

Notice of Reasons for Rejection dated Feb. 26, 2019 for Japanese Patent Application No. JP 2017-043606 and English translation.
Notification of Reasons for Refusal dated Apr. 16, 2019 from the cooresponding Japanese Patent Application No. JP 2017-043606 and English Translation.
Office Action dated May 23, 2019 from corresponding Chinese Patent Application No. 201810182032.6 and English translation.

* cited by examiner

IMAGE READING APPARATUS AND IMAGE FORMING SYSTEM

CROSS REFERENCE TO RELATED APPLICATIONS

The entire disclosure of Japanese patent Application No. 2017-043606, filed on Mar. 8, 2017, is incorporated herein by reference in its entirety.

BACKGROUND

Technological Field

The present invention relates to an image reading apparatus and an image forming system.

Description of Related Art

Image forming apparatuses utilizing electrophotographic process technology (printers, copiers, facsimile machines, for example) typically form electrostatic latent images by irradiating charged image bearing members, such as photoconductor drums, with laser beams on the basis of image data. Toner images are then formed by supplying toners from developing apparatuses to the image bearing members, on which the electrostatic latent images have been formed, so as to visualize the electrostatic latent images. Further, the toner images are transferred to sheets directly or indirectly, and then fixed through heating and pressing by fixing nips to form toner images on the sheets.

Efforts have been made for practical use of an image forming system in which an image forming apparatus described above is connected to an image reading apparatus that reads images formed on sheets and feeds back the read information to the image forming apparatus such that colors, positions, and magnifications, for example, of the images are set to correct values. In such an image reading apparatus, although a slower conveying speed results in higher accuracy in reading of images, a conveying speed during reading of images is set to nearly the same speed as a conveying speed in an image forming apparatus such that the productivity of the image forming system does not fall.

In the above image forming system, a post-processing apparatus that performs post-processing of sheets, such as aligning, stitching, and/or folding, is connected to the latter part of the image reading apparatus in some cases. In this case, a conveying speed of sheets in the post-processing apparatus is set to be faster than a conveying speed in the image forming apparatus. By such a setting, a gap between a sheet being conveyed in the post-processing apparatus and the following sheet widens, thereby securing time required for post-processing in the post-processing apparatus.

Such control for accelerating a conveying speed in the post-processing apparatus is performed by withdrawing a sheet being conveyed inside the image reading apparatus after reading of its image in the image reading apparatus has been completed. As a configuration for withdrawing a sheet inside the image reading apparatus, for example, there is known a configuration in which each conveyance roller pair positioned on the downstream side of a reading section includes a roller equipped with a one-way clutch that can rotate only in one direction (see Japanese Patent Application Laid-Open No. 2003-252477, for example).

SUMMARY

In such a conventional configuration, however, there is a risk of causing reading failure due to fluctuations in the conveying speed of sheets in the reading section. One of the primary causes is as follows. Specifically, as illustrated in FIG. 1, when a bend in sheet S arises in the region of reading section 202 on the upstream side of rollers 300 equipped with one-way clutches, a restoring force (arrow direction) for offsetting the bend acts on sheet S.

Since the restoring force causes the bend portion of sheet S to move in the conveying direction of sheet S, such a movement increases the conveying speed in the region of rollers 300 equipped with one-way clutches, resulting in idling of rollers 300. Moreover, when there is a play between a one-way clutch and its driving shaft, roller 300 equipped with the one-way clutch tends to idle due to the play.

Consequently, since the conveying speed of sheet S fluctuates during reading of images in reading section 202, there is a risk of causing expansion and contraction of read images in reading section 202 and thus resulting in reading failure.

An object of the present invention is to provide an image reading apparatus and an image forming system that can suppress the occurrence of reading failure due to changes in the conveying speed of sheets during reading of images.

To achieve at least one of the abovementioned objects, an image reading apparatus reflecting one aspect of the present invention is an image reading apparatus that reads an image formed on a sheet, including: a reader that reads the image formed on the sheet; a first conveyance roller pair that is provided on a downstream side of a reading position of the reader in a conveying direction of the sheet and that conveys the sheet; a second conveyance roller pair that is provided on a downstream side of the first conveyance roller pair in the conveying direction of the sheet and that conveys the sheet; and a hardware processor that lowers a conveying force exerted by the second conveyance roller pair on the sheet when acceleration control for accelerating a conveying speed of the sheet whose image has been read by the reader is performed in the apparatus on the downstream side, compared with a case in which the acceleration control is not performed.

To achieve at least one of the abovementioned objects, an image forming system reflecting one aspect of the present invention includes: an image former that forms an image on the sheet; the above image reading apparatus to which the sheet on which an image has been formed is conveyed; and a post processor to which the sheet whose image has been read is conveyed from the image reading apparatus.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
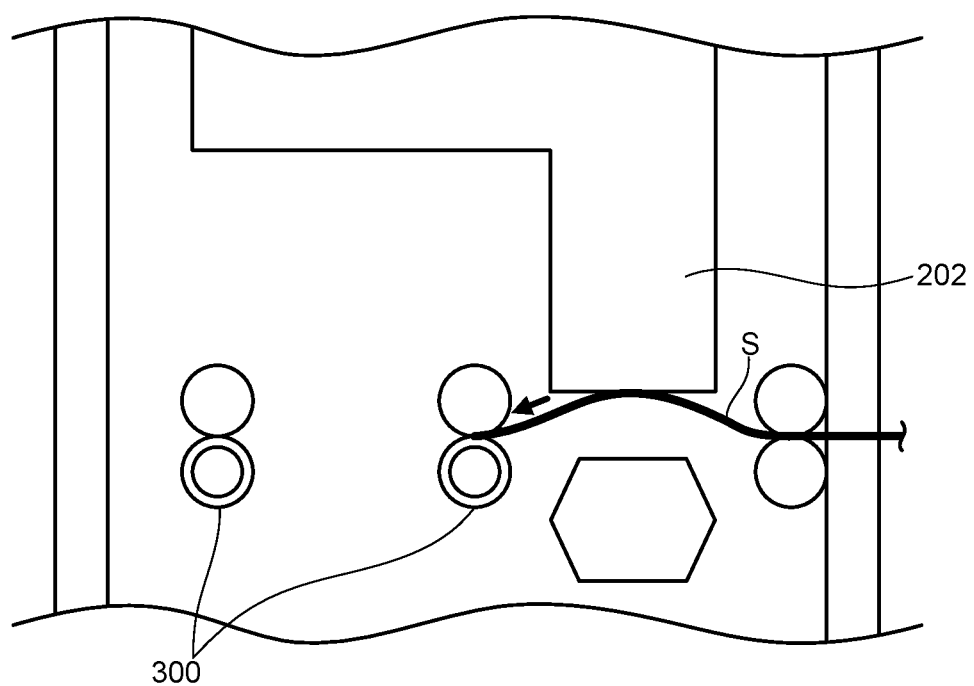
FIG. 1 illustrates a state in which a bend in a sheet arises in the region facing a reading section in a conveying path.
Figure 2:
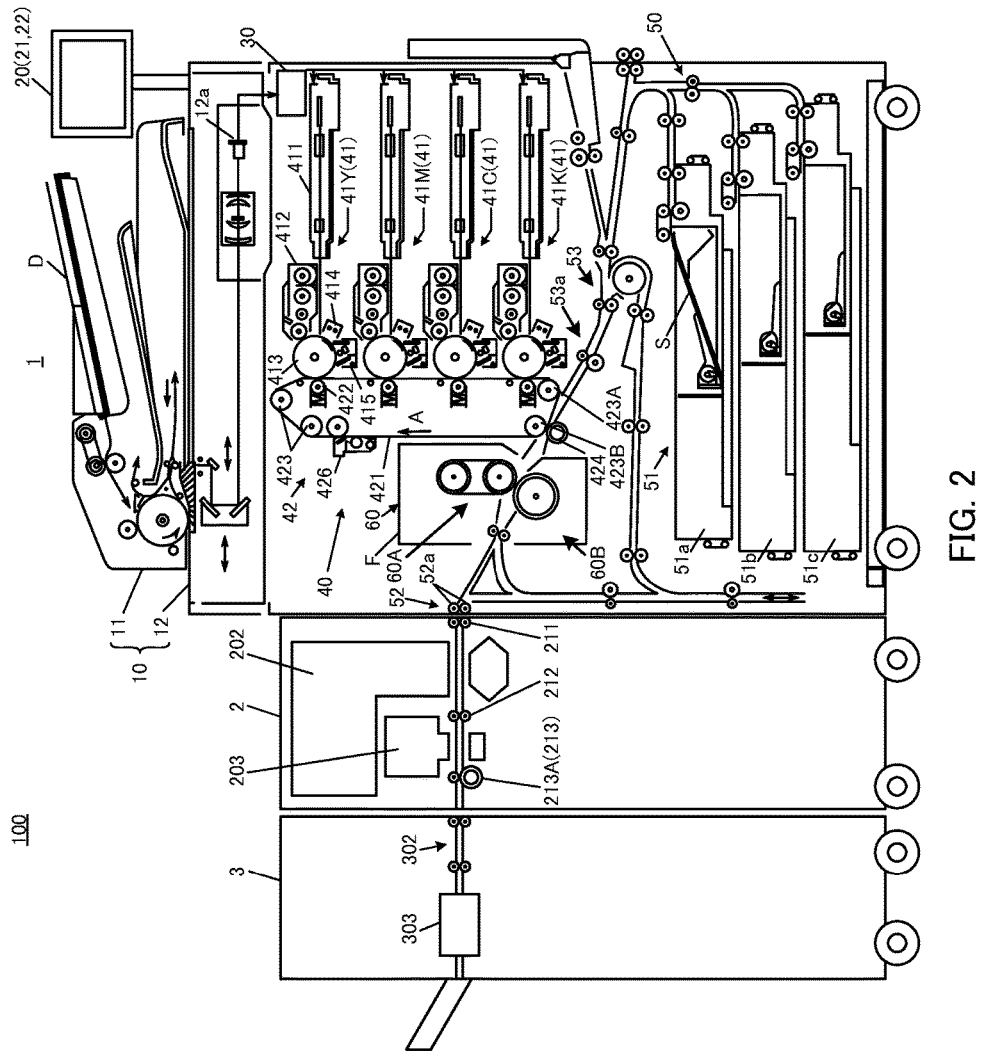
FIG. 2 schematically illustrates the entire configuration of an image forming system according to the embodiment.
Figure 3:
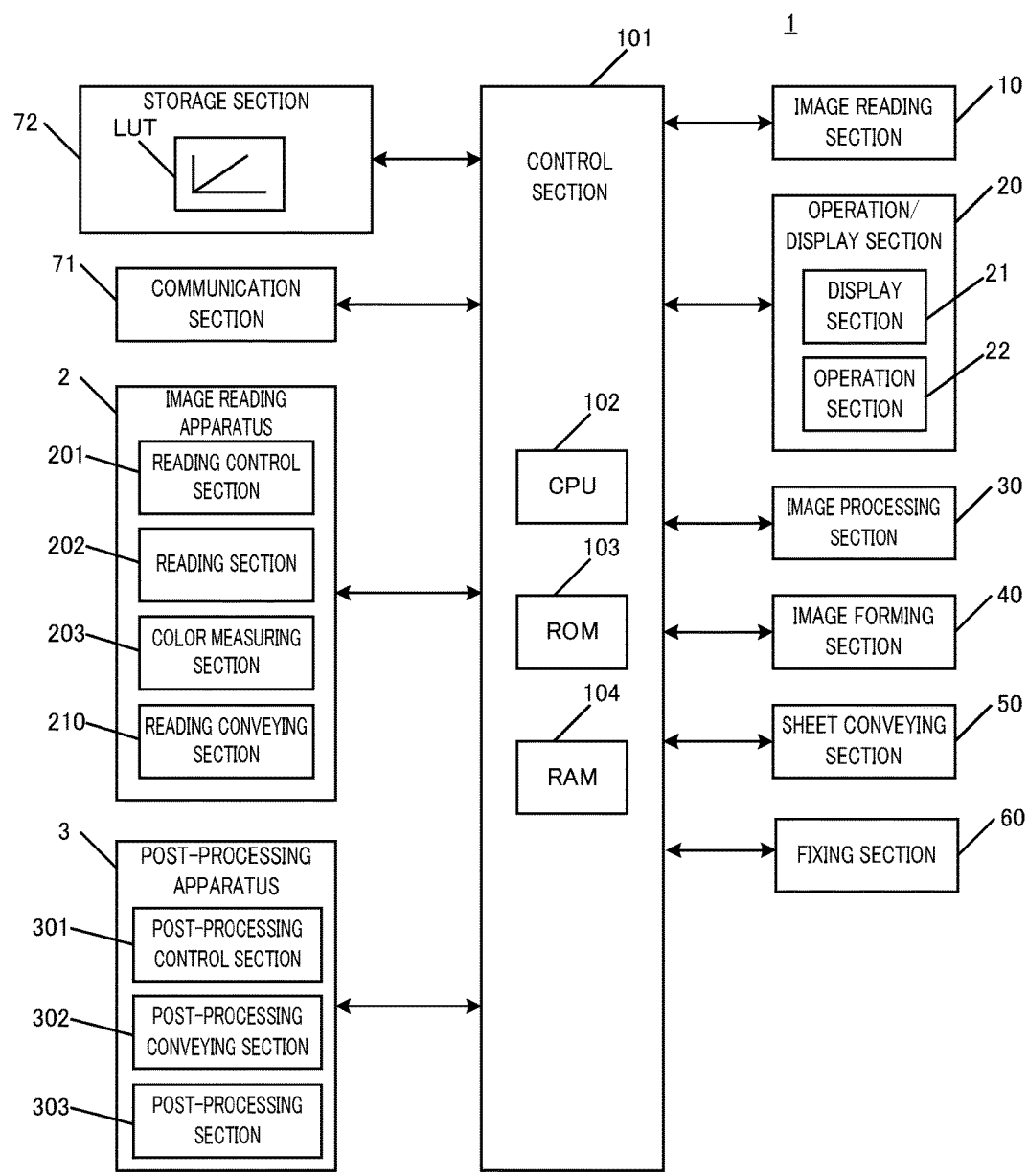
FIG. 3 shows the main part of the entire control system of the image forming system according to the embodiment.

In the following, the embodiments will be described in detail with reference to the drawings. FIG. 2 schematically illustrates the entire configuration of image forming system 100 according to the embodiment. FIG. 3 shows the main part of the entire control system of image forming system 100 according to the embodiment.

As illustrated in FIG. 2, image forming system 100 includes image forming apparatus 1, image reading apparatus 2, and post-processing apparatus 3, which are sequentially connected from the upstream side in the conveying direction of sheet S.

Image forming apparatus 1 is an intermediate transfer-mode color image forming apparatus utilizing electrophotographic process technology. Image forming apparatus 1 transfers color toner images of yellow (Y), magenta (M), cyan (C), and black (K) formed on photoconductor drums 413 to intermediate transfer belt 421 to superimpose the four color toner images on intermediate transfer belt 421 (primary transfer), and then transfers the superimposed images to sheet S sent out from sheet feeding tray units 51a to 51c to form an image (secondary transfer).

Image forming apparatus 1 employs a tandem mode in which photoconductor drums 413 corresponding to YMCK four colors are arranged in series in the running direction of intermediate transfer belt 421, and the respective color toner images are successively transferred to intermediate transfer belt 421 in a single procedure.

As shown in FIG. 3, image forming apparatus 1 includes image reading section 10, operation/display section 20, image processing section 30, image forming section 40, sheet conveying section 50, fixing section 60, and control section 101.

Control section 101 of image forming apparatus 1 includes central processing unit (CPU) 102, read only memory (ROM) 103, and random access memory (RAM) 104, for example. CPU 102 reads a program corresponding to processing details from ROM 103, loads the program into RAM 104, and performs, cooperatively with the loaded program, centralized control of the operation in respective blocks of image forming apparatus 1. During this step, various data stored in storage section 72 are referred to. Storage section 72 is composed of, for example, a nonvolatile semiconductor memory (so-called flash memory) and/or a hard disk drive.

Control section 101 transmits and receives various data to and from an external apparatus (personal computer, for example) connected to a communication network, such as a local area network (LAN) or a wide area network (WAN), via communication section 71. Control section 101, for example, receives image data transmitted from an external apparatus, and causes an image to be formed on sheet S on the basis of the image data (input image data). Communication section 71 is composed of, for example, a network interface card, such as a LAN adapter. Reading control section 201 of image reading apparatus 2 and post-processing control section 301 of post-processing apparatus 3, both of which will be described hereinafter, are also connected to control section 101.

As illustrated in FIG. 2, image reading section 10 includes auto document feeder (ADF) 11 and document image scanner 12, for example.

Auto document feeder 11 conveys, by a conveying mechanism, document D placed on a document tray and sends it out to document image scanner 12. Auto document feeder 11 enables simultaneous continuous reading of images on many documents D placed on a document tray.

Document image scanner 12 optically scans documents conveyed from auto document feeder 11 onto a contact glass or documents placed on a contract glass, and images reflected light from the documents on a light receiving surface of charge coupled device (CCD) sensor 12a to read document images. Image reading section 10 generates input image data based on the results read by document image scanner 12. The input image data undergoes predetermined image processing in image processing section 30.

As shown in FIG. 3, operation/display section 20 is composed of, for example, a touch panel-type liquid crystal display (LCD), and functions as both display section 21 and operation section 22. Display section 21 displays, for example, various operation screens, the state of images, the operation status of each function in accordance with display control signals input from control section 101. Operation section 22, which is equipped with various operation keys, such as a numeric keypad and a start key, receives various input operations by a user and outputs operation signals to control section 101.

Image processing section 30 includes, for example, a circuit that performs digital image processing of input image data in accordance with default settings or user settings. For example, image processing section 30 performs tone correction based on tone correction data (tone correction table) under the control of control section 101. Moreover, image processing section 30 performs, for example, various correction processing, such as color correction or shading correction, in addition to tone correction, and/or compression processing of input image data. Image forming section 40 is controlled on the basis of the thus-processed image data.

As illustrated in FIG. 2, image forming section 40 includes, for example, intermediate transfer unit 42 and image forming units 41Y, 41M, 41C, and 41K for forming images of color toners of Y component, M component, C component, and K component, based on input image data.

Image forming units 41Y, 41M, 41C, and 41K for Y component, M component, C component, and K component have similar configurations. For the purpose of convenience in illustration and description, common components are denoted by the same numerals while the numerals are accompanied by Y, M, C, or K when they are distinguished from each other. In FIG. 2, only components of image forming unit 41Y for Y component are denoted by numerals, and numerals are omitted for components of other image forming units 41M, 41C, and 41K.

Image forming unit 41 includes exposing device 411, developing device 412, photoconductor drum 413, charging device 414, and drum cleaning device 415, for example.

Photoconductor drum 413 is, for example, a negative-charging organic photoconductor (OPC) formed by successively stacking an undercoat layer (UCL), a charge generation layer (CGL), and a charge transport layer (CTL) on a peripheral surface of an aluminum conductive cylinder (aluminum tube).

Control section 101 causes photoconductor drum 413 to rotate at a constant peripheral speed by controlling driving current supplied to a driving motor (not shown) for rotating photoconductor drum 413.

Charging device 414 evenly and negatively charges the surface of photoconductor drum 413. Exposing device 411 is formed as a semiconductor laser, for example, and irradiates photoconductor drum 413 with laser beams corresponding to images of respective color components.

Developing device 412 is, for example, a developing device of a two-component developing system, and forms a toner image by attaching a toner of each color component to the surface of photoconductor drum 413 to visualize an electrophotographic latent image.

Drum cleaning device 415 includes, for example, a drum cleaning blade to be slid on the surface of photoconductor drum 413, and removes transfer residual toner remaining on the surface of photoconductor drum 413 after primary transfer.

Intermediate transfer unit 42 includes intermediate transfer belt 421, primary transfer roller 422, a plurality of support rollers 423, secondary transfer roller 424, and belt cleaning device 426, for example.

Intermediate transfer belt 421 is formed of an endless belt, and looped around a plurality of support rollers 423 under tension. At least one of support rollers 423 is a driving roller, and the rest are driven rollers. For example, roller 423A disposed on the downstream side of primary transfer roller 422 for K component in the running direction of the belt is preferably a driving roller. By such a configuration, a constant running speed of the belt in the primary transfer section is maintained easily. Intermediate transfer belt 421 runs in the arrow A direction at a constant speed by the rotation of driving roller 423A.

Intermediate transfer belt 421 is a conductive elastic belt, and is driven and rotated by control signals from control section 101.

Primary transfer roller 422 is disposed, on the side of the inner peripheral surface of intermediate transfer belt 421, so as to face photoconductor drum 413 of each color component. A primary transfer nip, for transferring a toner image to intermediate transfer belt 421 from photoconductor drum 413, is formed by firmly pressing primary transfer roller 422 against photoconductor drum 413 via intermediate transfer belt 421.

Secondary transfer roller 424 is disposed, on the side of the outer peripheral surface of intermediate transfer belt 421, so as to face backup roller 423B that is disposed on the downstream side of driving roller 423A in the running direction of the belt. A secondary nip for transferring a toner image to sheet S from intermediate transfer belt 421 is formed by firmly pressing secondary transfer roller 424 against backup roller 423B via intermediate transfer belt 421.

When intermediate transfer belt 421 passes through the primary transfer nip, toner images on photoconductor drums 413 are successively superimposed and transferred (primary transfer). Subsequently, when sheet S passes through the secondary transfer nip, toner images on intermediate transfer belt 421 are transferred to sheet S (secondary transfer). Sheet S bearing the transferred toner images is then conveyed to fixing section 60.

Belt cleaning device 426 removes transfer residual toner remaining on the surface of intermediate transfer belt 421 after secondary transfer.

Fixing section 60 includes, for example, upper fixing section 60A equipped with a fixing-side member that is disposed on the fixing side, i.e., the toner image-formed side of sheet S, and lower fixing section 60B equipped with a rear-side support member that is disposed on the rear side, i.e., the side opposite to the fixing side of sheet S. A fixing nip for pinching and conveying sheet S is formed by firmly pressing the rear-side support member against the fixing-side member.

Fixing section 60 heats and presses conveyed sheet S on which a toner image has been transferred (secondary transfer), thereby fixing the toner image on sheet S. Fixing section 60 is disposed, as a unit, inside fixing device F.

Sheet conveying section 50 includes sheet feeding section 51, sheet ejection section 52, and conveying path section 53, for example. Three sheet feeding tray units 51a to 51c, which constitute sheet feeding section 51, store sheets S (standard paper, special paper) classified based on basis weight and/or size, for example, in accordance with predetermined types. Conveying path section 53 includes a plurality of conveyance roller pairs, such as registration roller pair 53a.

Sheets S stored in sheet feeding tray units 51a to 51c are each sent out from the uppermost portion one by one and conveyed to image forming section 40 through conveying path section 53. In image forming section 40, toner images on intermediate transfer belt 421 are collectively transferred to either side of sheet S (secondary transfer), and undergoes a fixing process in fixing section 60. Sheet S bearing a formed image is ejected outside the apparatus by sheet ejection section 52 equipped with conveyance roller pair (ejection roller pair) 52a.

As in shown in FIGS. 2 and 3, image reading apparatus 2 is an apparatus for reading images formed on sheets S that have been ejected from image forming apparatus 1. Image reading apparatus 2 includes reading control section 201, reading section 202, color measuring section 203, and reading conveying section 210.

Reading control section 201 feeds back information received from reading section 202 and/or color measuring section 203 to control section 101 of image forming apparatus 1. Control section 101 of image forming apparatus 1 performs image correction such that colors, positions, and/or magnifications, for example, of images are set to correct values, based on the information fed back by reading control section 201 of image reading apparatus 2.

Reading section 202 is a scanner equipped with an optical image sensor that includes a lot of regularly arranged reading elements, such as CCD or CMOS, and is configured to be able to read the position and the density of an image formed on sheet S. Reading section 202 outputs image information read thereby to reading control section 201.

Color measuring section 203 is a spectrophotometer, for example, and is configured to be able to read the color, the brightness, and the chroma of an image. Color measuring section 203 outputs image information read thereby to reading control section 201.

Reading conveying section 210 includes reading upstream roller pair 211, reading downstream roller pair 212, and outward-conveying roller pair 213, which are aligned in the conveying direction of sheet S, and conveys sheet S ejected from image forming apparatus 1 toward post-processing apparatus 3.

Reading upstream roller pair 211 is positioned on the upstream side of the reading position of reading section 202 in the conveying direction of sheet S, and receives sheet S conveyed from image forming apparatus 1 and conveys sheet S toward the reading position of reading section 202.

Reading downstream roller pair 212 is a first conveyance roller pair, which is positioned on the downstream side of the reading position of reading section 202 in the conveying direction of sheet S, and is also positioned on the upstream side of outward-conveying roller pair 213.

Reading downstream roller pair 212 conveys sheet S while maintaining a predetermined nip pressure. In other words, reading downstream roller pair 212 conveys sheet S at a conveying speed set by reading control section 201.

Outward-conveying roller pair 213 is a second conveyance roller pair, which is positioned on the downstream side of the color measuring position of color measuring section 203, and conveys sheet S whose image-related information has been read by reading section 202 and color measuring section 203 outside the apparatus, i.e., toward post-processing apparatus 3.

Lower roller 213A of two rollers that constitute outward-conveying roller pair 213 is a one-way rotation roller that rotates only in the conveying direction of sheet S. Lower roller 213A is fixed on a rotation driving shaft via an idling mechanism that can idle in the conveying direction.

Examples of the idling mechanisms include a one-way clutch and an electric clutch that are configured to transmit torque in one direction between coaxial outer ring and inner ring. In view of costs and performance, it is preferable to employ a roller equipped with a one-way clutch as an idling mechanism.

Since the idling mechanism is provided in outward-conveying roller pair 213, lower roller 213A is dragged and rotated by sheet S when the conveying speed of sheet S is accelerated by post-processing apparatus 3 during conveyance of sheet S by outward-conveying roller pair 213.

Through this operation, outward-conveying roller pair 213 idles, and thus a conveying force exerted by outward-conveying roller pair 213 on sheet S is automatically lowered. Accordingly, differences in speed between image reading apparatus 2 and post-processing apparatus 3 are absorbed, and the conveying speed of sheet S can be smoothly synchronized with the conveying speed inside post-processing apparatus 3.

Post-processing apparatus 3 is an apparatus for performing post-processing of sheets, such as aligning, stitching, and/or folding, and includes post-processing control section 301, post-processing conveying section 302, and post-processing section 303.

Post-processing control section 301 performs acceleration control of the conveying speed of sheet S in post-processing apparatus 3 by controlling post-processing conveying section 302.

Post-processing conveying section 302 includes conveyance roller pairs and conveys sheet S conveyed from image reading apparatus 2 toward post-processing section 303. Sheet S conveyed by post-processing conveying section 302 undergoes post-processing in post-processing section 303 and is ejected outside the apparatus.

Meanwhile, in image reading apparatus 2, although a slower conveying speed results in higher accuracy in reading of images, a conveying speed during reading of images by reading section 202 is set to nearly the same speed as a conveying speed in image forming apparatus 1 such that the productivity of image forming system 100 does not fall.

In post-processing apparatus 3, however, if sheet S is conveyed at the same conveying speed as a conveying speed in image reading apparatus 2, the following sheet S arrives while post-processing of the preceding sheet is performed. Consequently, if sheet S is conveyed at the same conveying speed as a conveying speed in image reading apparatus 2, a gap between sheet S being post-processed and the following sheet S narrows.

Figure 4:
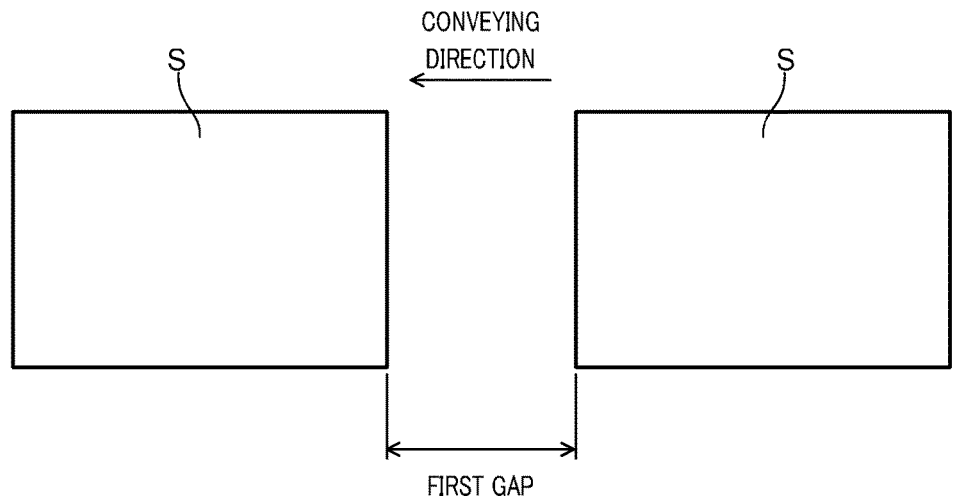
FIG. 4 shows sheets being conveyed with a first gap.

Specifically, as shown in FIG. 4, when a gap between sheets in image forming apparatus 1 and in image reading apparatus 2 is set to a first gap, the gap becomes narrower than the first gap while post-processing is performed in post-processing apparatus 3.

Accordingly, the conveying speed of sheet S in post-processing apparatus 3 is set to be faster than the conveying speed of sheet S in image forming apparatus 1 and image reading apparatus 2.

Figure 5:
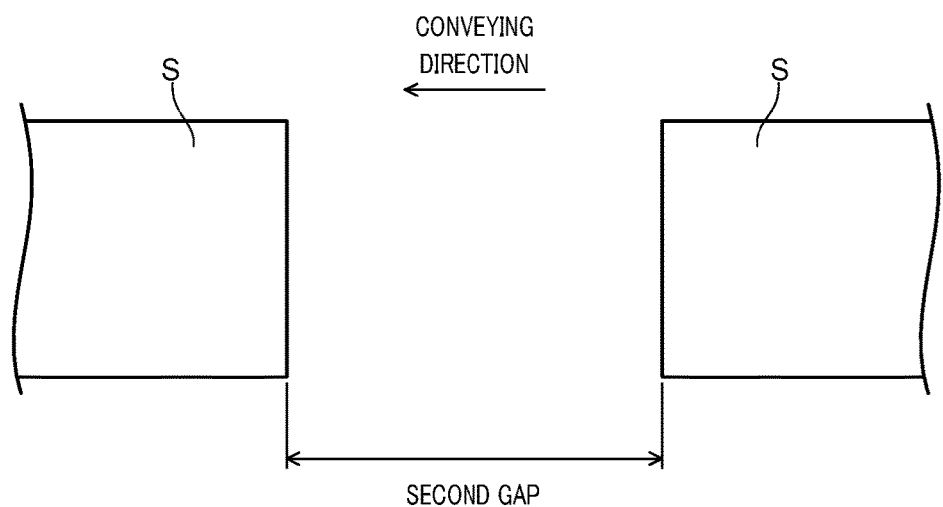
FIG. 5 shows sheets being conveyed with a second gap.

By such a setting, as shown in FIG. 5, sheet S inside image reading apparatus 2 is withdrawn by post-processing apparatus 3, and thus the gap between sheets becomes a second gap, which is wider than the first gap. Consequently, time required for post-processing in post-processing apparatus 3 is secured.

The conveying speed of sheet S in post-processing apparatus 3 is appropriately set in accordance with post-processing details, and is set, for example, an approximately two times faster conveying speed than the conveying speed of sheet S in image forming apparatus 1 and image reading apparatus 2.

When sheet S is withdrawn by post-processing apparatus 3, sheet S is smoothly withdrawn by post-processing apparatus 3 since outward-conveying roller pair 213 idles.

Meanwhile, in some cases, a bend in sheet S being conveyed arises on the upstream side of outward-conveying roller pair 213, specifically, in the region of the reading position in reading section 202. Such a bend arises, for example, when sheet S being conveyed does not advance into a conveying nip of reading downstream roller pair 212 (hereinafter, referred to as "reading downstream nip") and collides with either roller of reading downstream roller pair 212.

When a bend in sheet S arises, a restoring force for offsetting the bend acts on sheet S and thus causes the bend portion of sheet S to move in the conveying direction. Accordingly, when reading downstream roller pair 212 includes a roller equipped with an idling mechanism, the movement of sheet S causes idling of the roller.

Moreover, when there is a play between an idling mechanism and its rotation driving shaft, the play further facilitates idling of a roller equipped with the idling mechanism.

Consequently, since the conveying speed of sheet S increases during reading of images in reading section 202, there is a risk of causing expansion and contraction of read images in reading section 202 and thus resulting in reading failure.

Figure 6:
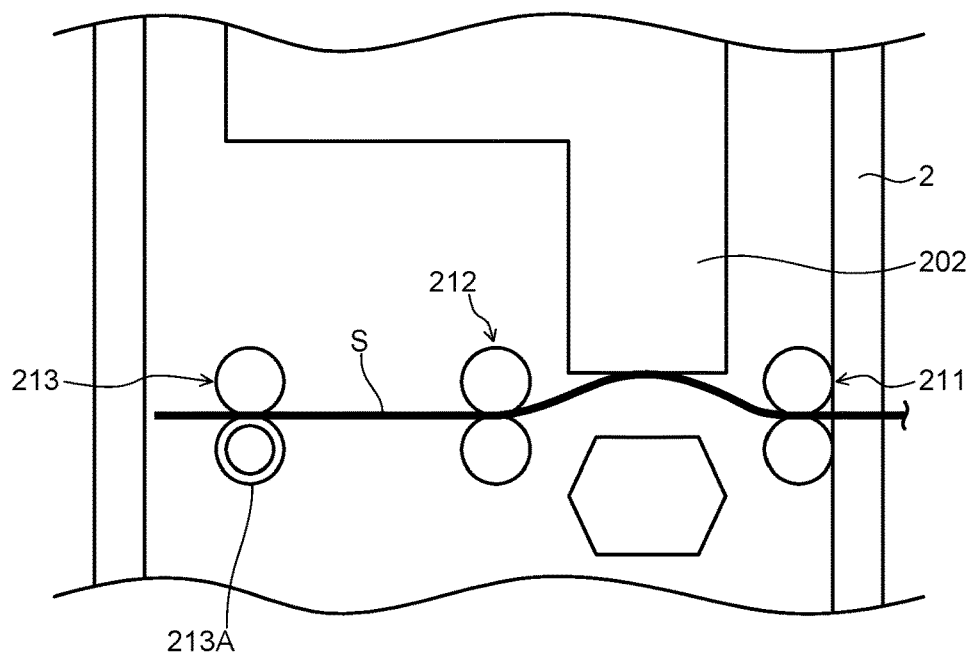
FIG. 6 illustrates a state in which a bend in a sheet arises in the region facing a reading section in the conveying path.

In the embodiment, however, as illustrated in FIG. 6, reading downstream roller pair 212 conveys sheet S while maintaining a predetermined nip pressure. Accordingly, even if a restoring force for offsetting a bend acts on sheet S, reading downstream roller pair 212 does not idle. In other words, in the embodiment, the occurrence of reading failure due to changes in the conveying speed of sheet S during reading of images can be suppressed.

Moreover, in image reading apparatus 2, a conveying force exerted from outward-conveying roller pair 213 on sheet S can be lowered since outward-conveying roller pair 213 idles when acceleration control for accelerating the conveying speed of sheet S by post-processing apparatus 3 is performed, compared with a case in which the acceleration control is not performed. In other words, the idling mechanism provided in outward-conveying roller pair 213 functions as a conveying force lowering section.

Figure 7:
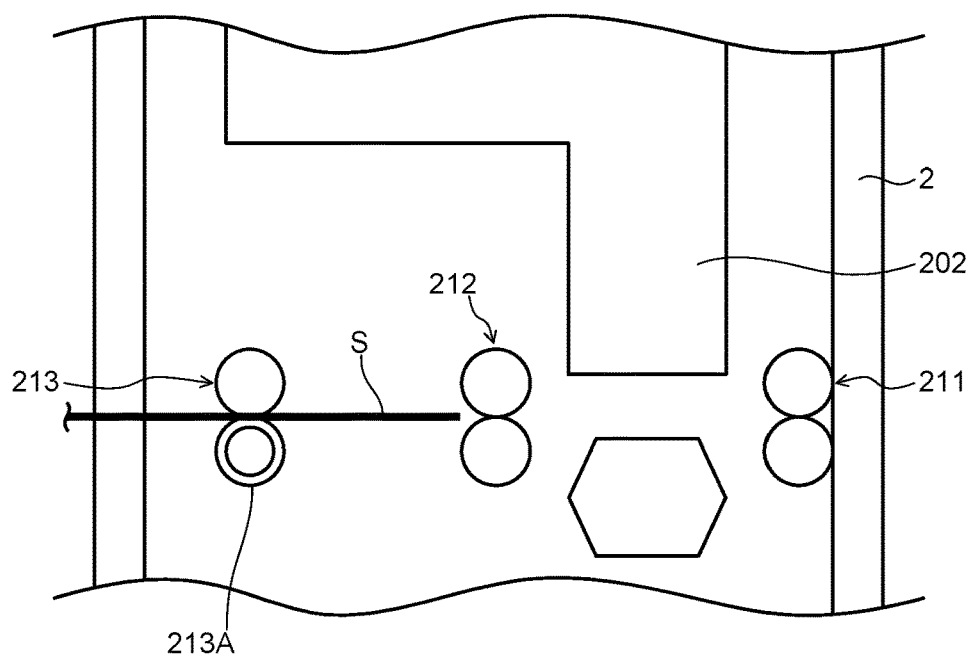
FIG. 7 illustrates a state in which the rear edge of the sheet has passed through a conveying nip of a conveyance roller pair that is located on the immediate downstream side of the reading section.

Specifically, as illustrated in FIG. 7, reading control section 201 outputs, on a timing when the rear edge of sheet S has passed through the reading downstream nip of reading downstream roller pair 212, information on the timing to post-preprocessing control section 301, as the control for changing the conveying speed of sheet S.

The timing when the rear edge of sheet S has passed through the reading downstream nip may be specified by conveyance time of sheet S or may be specified on the basis of information, for example, from a commonly known paper feeding detection section provided on the downstream side of the reading downstream nip.

Post-processing control section 301 obtains information on the timing, and controls, on the basis of the information, post-processing conveying section 302 such that the conveying speed of sheet S in post-processing apparatus 3 is changed from a first speed to a second speed, which is faster than the first speed.

In such an operation, since the conveying speed of sheet S is changed after a bend in sheet S in the reading position has been straightened, and/or after reading of images in reading section 202 has been completed, reading failure in reading section 202 can be prevented reliably. Moreover, withdrawing of sheet S while sheet S is pinched by reading downstream roller pair 212 can be suppressed.

Figure 8:
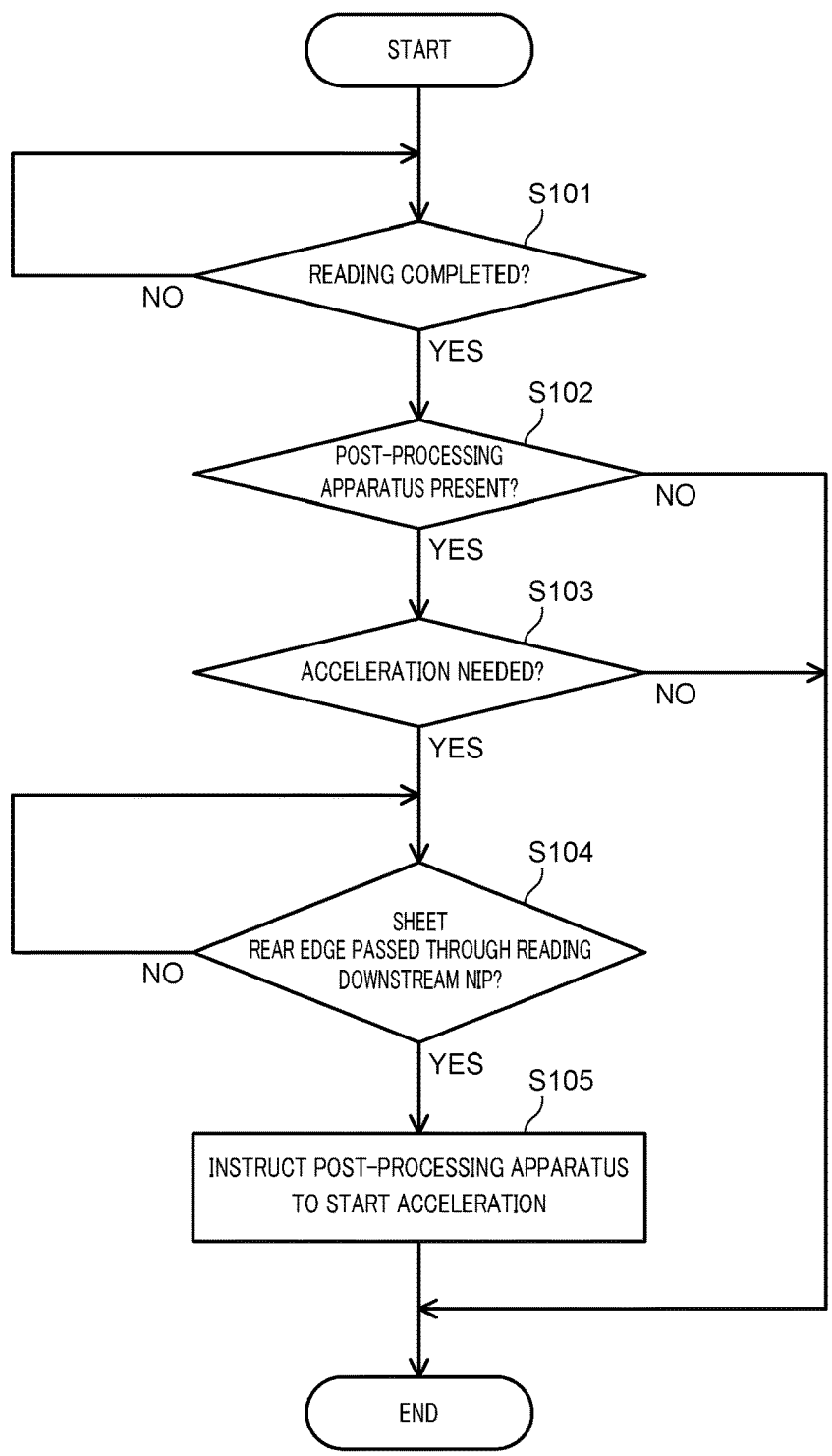
FIG. 8 is a flow chart showing an example of reading conveyance control in the image reading apparatus.

An example of reading conveyance control in image reading apparatus 2 configured as above will be described. FIG. 8 is a flow chart showing an example of reading conveyance control in image reading apparatus 2. The processing in FIG. 8 is performed appropriately when sheet S is conveyed into image reading apparatus 2.

As shown in FIG. 8, reading control section 201 determines whether reading by reading section 202 has been completed or not (step S101). As the results of the determination, if reading has yet to be completed (NO in step S101), the processing of step S101 is repeated. If reading has been completed (YES in step S101), reading control section 201 determines whether post-processing apparatus 3 is present or not in the latter part of image reading apparatus 2 (step S102).

As the results of the determination, if post-processing apparatus 3 is not connected (NO in step S102), sheet S is conveyed outside the apparatus without changing the conveying speed, and the present control ends. If post-processing apparatus 3 is present (YES in step S102), reading control section 201 determines whether acceleration of the conveying speed is needed or not (step S103).

As the results of the determination, if acceleration is not needed (NO in step S103), sheet S is conveyed outside the apparatus without changing the conveying speed, and the present control ends. If acceleration is needed (YES in step S103), reading control section 201 determines whether the rear edge of sheet S has passed through the reading downstream nip or not (step S104).

As the results of the determination, if the rear edge of sheet S has yet to pass through the reading downstream nip (NO in step S104), the processing of step S104 is repeated. If the rear edge of sheet S has passed through the reading downstream nip (YES in step S104), reading control section 201 outputs, to post-processing control section 301, information that the rear edge of sheet S has passed through the reading downstream nip, and instructs post-processing apparatus 3 to start acceleration (step S105). Subsequently, sheet S is conveyed outside the apparatus and the present control ends.

According to the embodiment configured as above, sheet S is conveyed at a first speed by reading downstream roller pair 212 during reading of images in reading section 202, and the conveying speed is accelerated from the first speed to a second speed on a timing without causing reading failure. Accordingly, the occurrence of reading failure due to changes in the conveying speed of sheet S during reading of images can be suppressed.

Further, since the conveying speed of sheet S is accelerated when the rear edge of sheet S has passed through the reading downstream nip of reading downstream roller pair 212, the conveying speed is changed after a bend in sheet S in the reading position has straightened and/or after reading of images by reading section 202 has been completed. Consequently, reading failure in reading section 202 can be reliably prevented. Moreover, withdrawing of sheet S while sheet S is pinched by reading downstream roller pair 212 can be suppressed.

Meanwhile, color measuring section 203 is not affected by changes in the conveying speed of sheet S since color measuring section 203 is for measuring colors of images, but not for accurately reading information on images. This means that measurement of colors by color measuring section 203 is not adversely affected even if the rear edge of sheet S has passed through reading downstream nip and the conveying speed of sheet S is accelerated during measurement of colors by color measuring section 203. Accordingly, the conveying speed of sheet S can be quickly accelerated once reading by reading section 202 has been completed.

Figure 9:
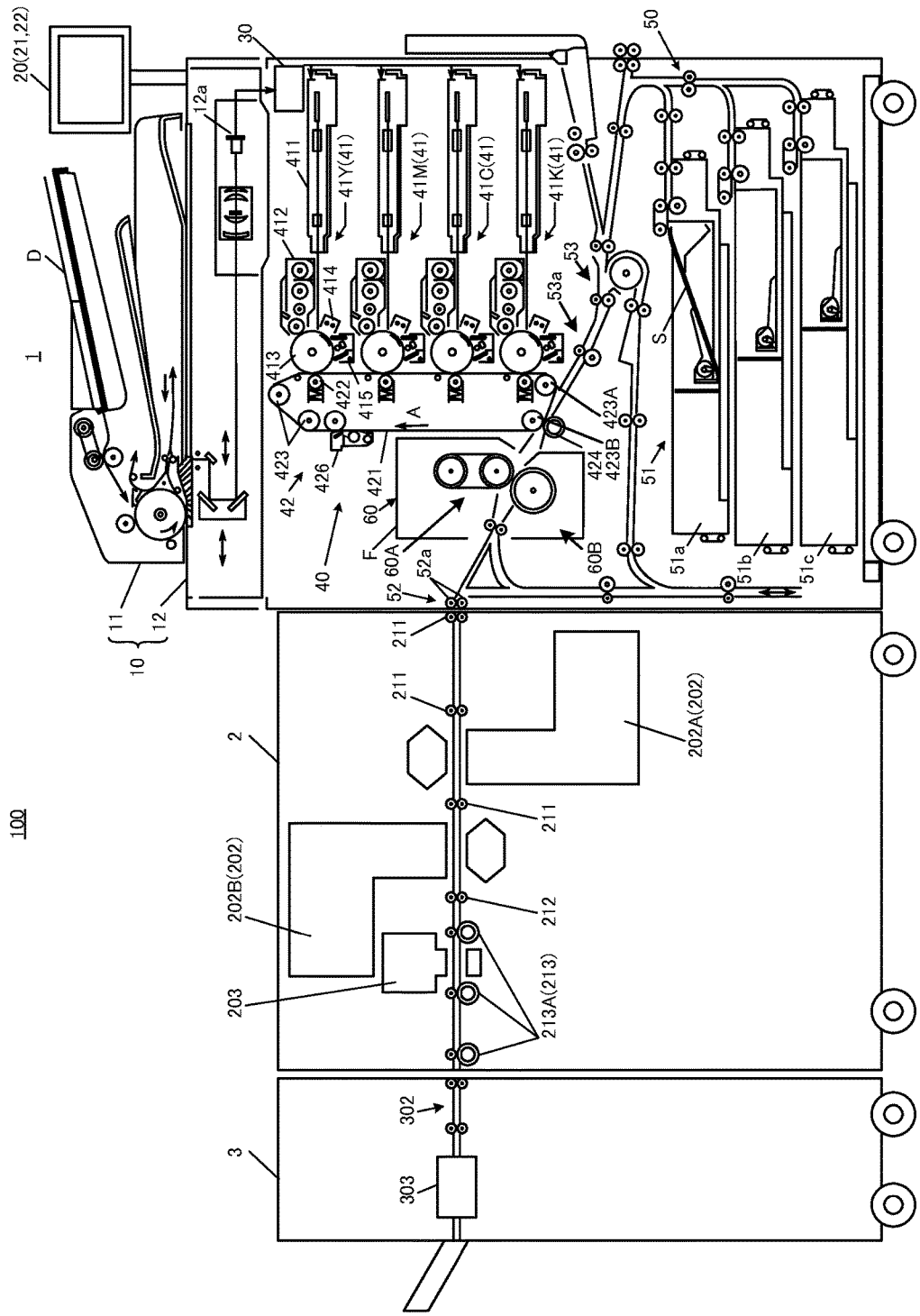
FIG. 9 schematically illustrates the entire configuration of an image forming system according to Variation 1.

In the above-described embodiment, only one reading section 202 is provided inside image reading apparatus 2. The present invention, however, is not limited to this, and two reading sections 202 may be provided as illustrated in FIG. 9.

In this configuration, reading sections 202 are each provided on the lower side and the upper side of the conveying path of sheet S inside image reading apparatus 2. Lower reading section 202A reads information on images formed on the lower side of sheet S inside image reading apparatus 2. Upper reading section 202B is positioned on the downstream side of lower reading section 202A in the conveying direction and reads information on images formed on the upper side of sheet S inside image reading apparatus 2.

Reading downstream roller pair 212 according to this embodiment is positioned on the downstream side of the reading position of reading section 202 positioned on the most downstream side in the conveying direction. Specifically, reading downstream roller pair 212 is positioned on the downstream side of the reading position of upper reading section 202B.

A plurality of outward-conveying roller pairs 213 are provided on the downstream side of reading downstream roller pair 212. Specifically, a total of three outward-conveying roller pairs 213 are provided: one on the upstream side of the color measuring position in color measuring section 203, and two on the downstream side of the color measuring position in color measuring section 203.

By the plurality of outward-conveying roller pairs 213, measurement of colors in color measuring section 203 can be performed while sheet S is held firmly. Even if the conveying speed of sheet S is accelerated while each outward-conveying roller pair 213 pinches sheet S, sheet S can be quickly withdrawn by post-processing apparatus 3 since all of outward-conveying roller pairs 213 idle.

When images on both sides of sheet S are read in the image forming system of FIG. 2, a reversing path for reversing sheet S may be provided inside image reading apparatus 2 such that sheet S is conveyed to the reading position again by passing through the reversing path.

Figure 10:
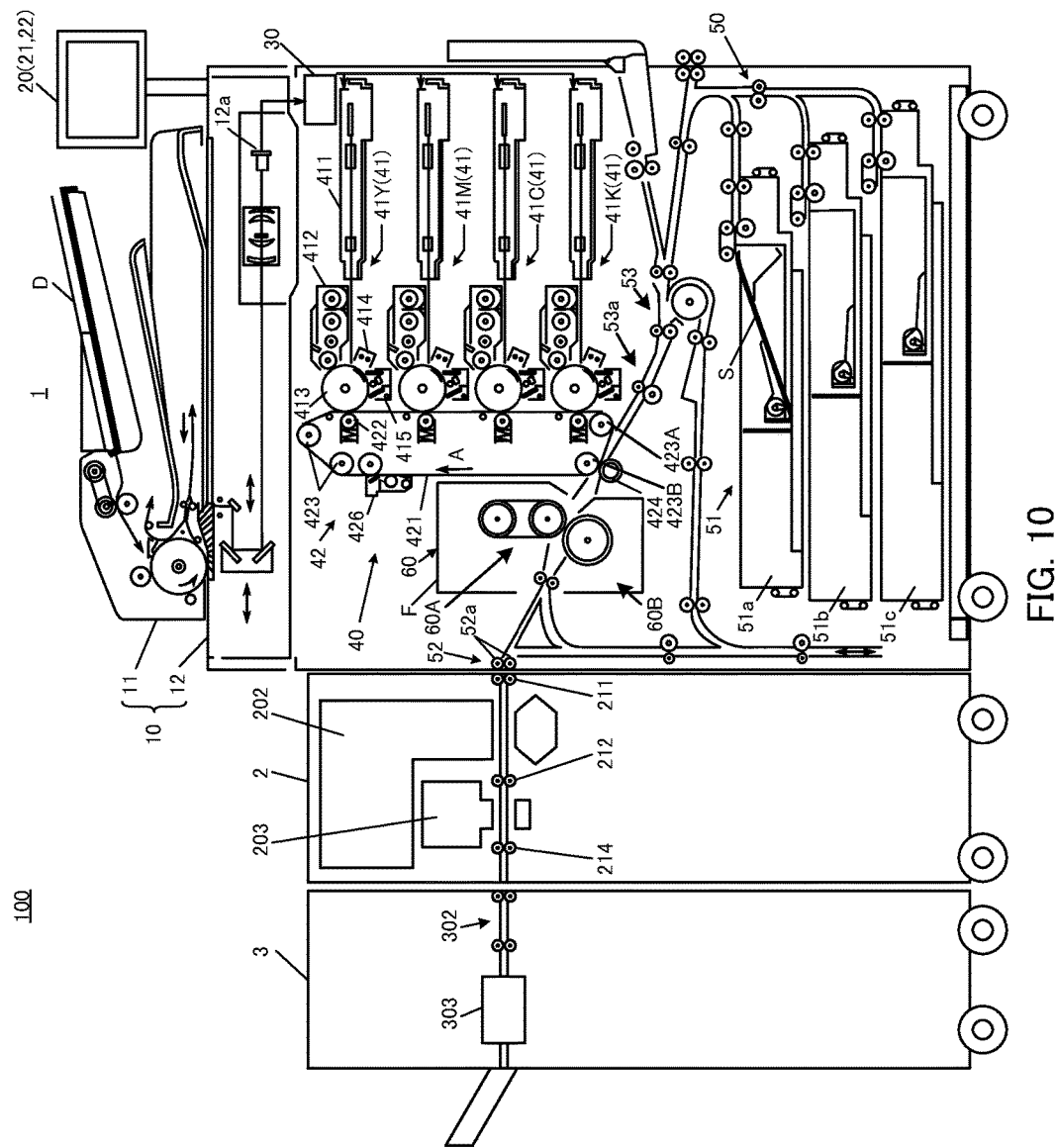
FIG. 10 schematically illustrates the entire configuration of an image forming system according to Variation 2.

In the above embodiment, outward-conveying roller pairs 213 include one-way rotation rollers. The present invention, however, is not limited to this, and may be configured to change a nip pressure as illustrated in FIG. 10.

In outward-conveying roller pair 214 according to this configuration, each roller is configured to move toward and away from the other roller. Reading control section 201 causes either roller of outward-conveying roller pair 214 to move away from the other roller when the conveying speed of sheet S is accelerated.

Figure 11:
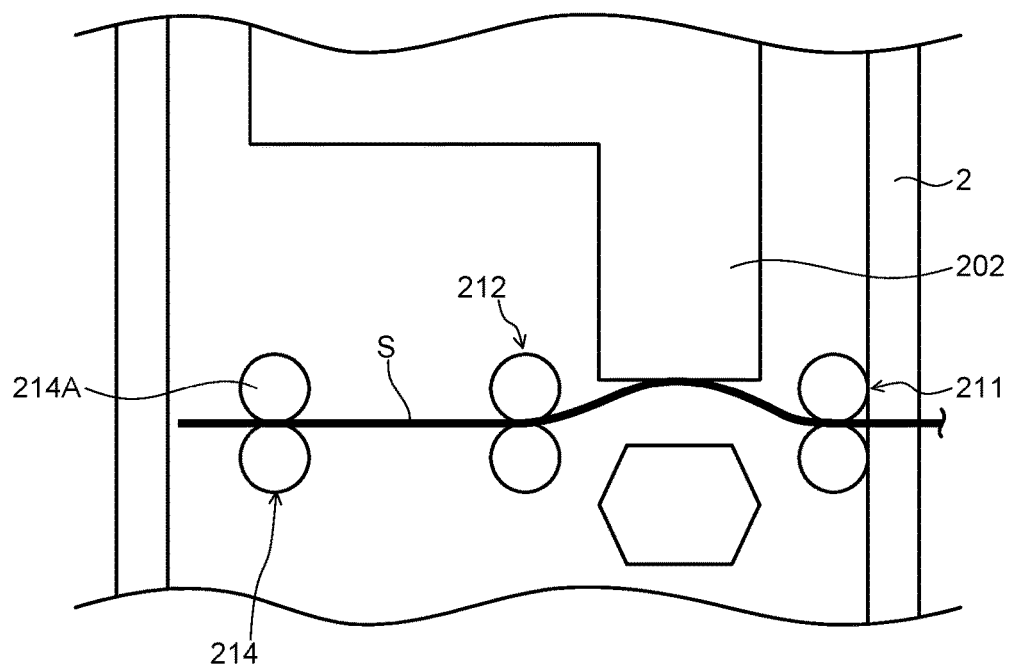
FIG. 11 illustrates a state in which a bend in a sheet arises in the region of a reading section in Variation 2.

Specifically, as illustrated in FIG. 11, when sheet S is pinched by reading downstream roller pair 212, outward-conveying roller pair 214 conveys sheet S while maintaining a predetermined nip pressure in the similar manner to reading downstream roller pair 212.

Figure 12:
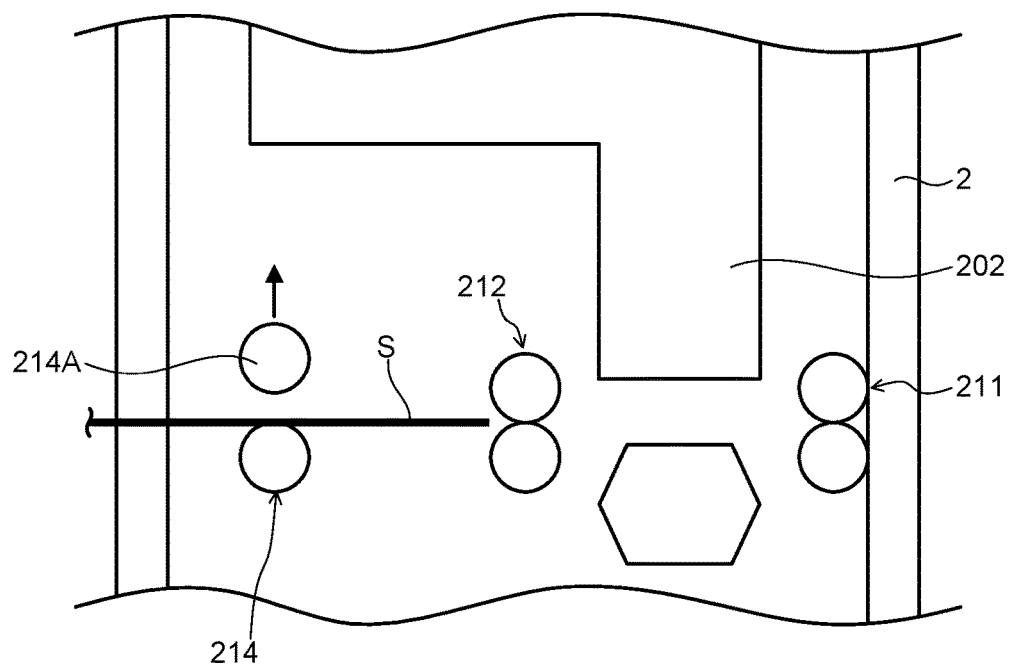
FIG. 12 illustrates a state in which the rear edge of the sheet has passed through a conveying nip of a conveyance roller pair on the immediate downstream side of the reading section in Variation 2.

In outward-conveying roller pair 214, as illustrated in FIG. 12, upper roller 214A moves away from sheet S under the control of reading control section 201 after the rear edge of sheet S has passed through the reading downstream nip of reading downstream roller pair 212. Accordingly, a conveying force acting on sheet S is lowered. In other words, in this example configuration, reading control section 201 and outward-conveying roller pair 214 equipped with a separation mechanism based on instructions from reading control section 201 constitute a conveying force lowering section.

Figure 13:
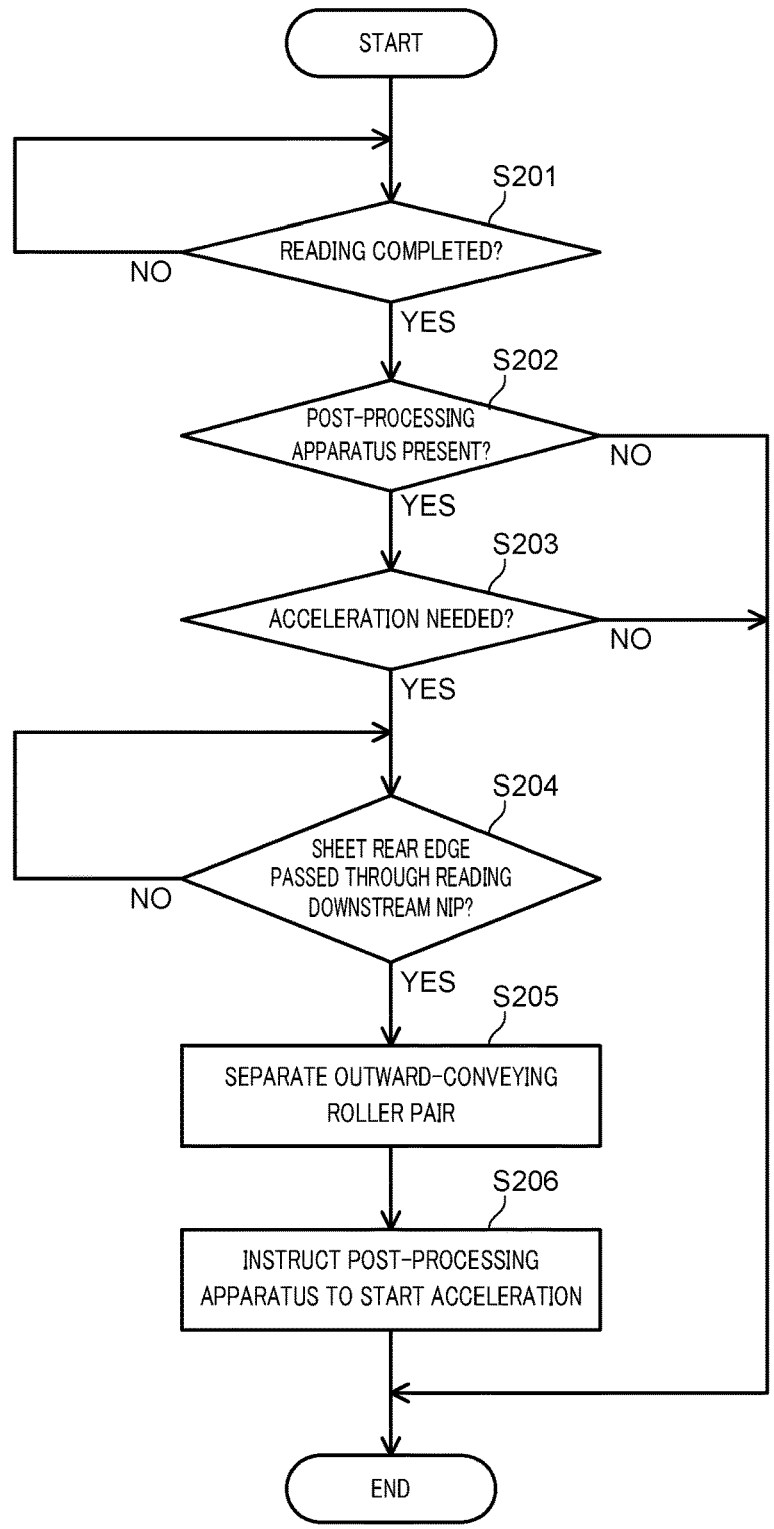
FIG. 13 is a flow chart showing an example of reading conveyance control in the image reading apparatus according to Variation 2.

An example of reading conveyance control in image reading apparatus 2 configured as above will be described. FIG. 13 is a flow chart showing an example of reading conveyance control in image reading apparatus 2 according to the configuration illustrated in FIG. 10 (Variation 2). The processing in FIG. 13 is appropriately performed when sheet S is conveyed into image reading apparatus 2.

As shown in FIG. 13, reading control section 201 determines whether reading by reading section 202 has been completed or not (step S201). As the results of the determination, if reading has yet to be completed (NO in step S201), the processing of step S201 is repeated. If reading has been completed (YES in step S201), reading control section 201 determines whether post-processing apparatus 3 is present or not in the latter part of image reading apparatus 2 (step S202).

As the results of the determination, if post-processing apparatus 3 is not present (NO in step S202), sheet S is conveyed outside the apparatus without changing the conveying speed and the present control ends. If post-processing apparatus is present (YES in step S202), reading control section 201 determines whether acceleration of the conveying speed in post-processing apparatus 3 is needed or not (step S203).

As the results of the determination, if acceleration is not needed (NO in step S203), sheet S is conveyed outside the apparatus without changing the conveying speed, and the present control ends. If acceleration is needed (YES in step S203), reading control section 201 determines whether the rear edge of sheet S has passed through the reading downstream nip or not (step S204).

As the results of the determination, if the rear edge of sheet S has yet to pass through the reading downstream nip (NO in step S204), the processing of step S204 is repeated. If the rear edge of sheet S has passed through the reading downstream nip (YES in step S204), reading control section 201 causes either roller of outward-conveying roller pair 214 to move away from the other roller (step S205).

Reading control section 201 then outputs, to post-processing control section 301, information that the rear edge of sheet S has passed through the reading downstream nip, and instructs post-processing apparatus 3 to start acceleration (step S206). Subsequently, sheet S is conveyed outside the apparatus and the present control ends.

This configuration can also suppress the occurrence of reading failure due to changes in the conveying speed of sheet S during reading of images.

In the configuration illustrated in FIG. 10, only one outward-conveying roller pair 214 is provided, but a plurality of outward-conveying roller pairs may be provided, for example, when a plurality of reading sections 202 are provided as illustrated in FIG. 9. Specifically, outward-conveying roller pair 214 illustrated in FIG. 10 may be replaced with outward-conveying roller pairs 213 illustrated in FIG. 9.

In each embodiment, although the conveying speed of sheet S is accelerated by post-processing conveying section 302 inside post-processing apparatus 3, the present invention is not limited to this. For example, the conveying speed of sheet S may be accelerated by providing a conveyance roller pair that maintains a predetermined nip pressure in a position on the downstream side of an outward-conveying roller pair and controlling the conveyance roller pair under the control of reading control section 201. Further, when a plurality of outward-conveying roller pairs are provided, the conveying speed of sheet S may be accelerated by increasing only the rotational speed of an outward-conveying roller pair positioned on the most downstream side.

The aforementioned embodiments just describe examples of embodiments for practicing the present invention, and should not be construed as limiting the technical scope of the present invention in any way. Therefore, variations are possible without departing from the spirit or main features of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus that reads an image formed on a sheet and sends the sheet to an apparatus on a downstream side, comprising:
   a reader that reads the image formed on the sheet;
   a first conveyance roller pair that is provided on a downstream side of a reading position of the reader in a conveying direction of the sheet and that conveys the sheet, wherein the first conveyance roller pair does not idle under a force acting on the sheet in the conveying direction;

a second conveyance roller pair that is provided on a downstream side of the first conveyance roller pair in the conveying direction of the sheet and that conveys the sheet; and wherein a conveying force exerted from the second conveyance roller pair on the sheet is lowered when acceleration control for accelerating a conveying speed of the sheet whose image has been read by the reader is performed in the apparatus on the downstream side, compared with a case in which the acceleration control is not performed.

2. The image reading apparatus according to claim 1, wherein the second conveyance roller pair includes a roller that is fixed on a rotation driving shaft via an idling mechanism and that idles through the idling mechanism when the acceleration control is performed, the idling mechanism being able to idle in the conveying direction.

3. The image reading apparatus according to claim 1, further comprising a hardware processor that causes either roller of the second conveyance roller pair to move away from the other roller when the acceleration control is performed.

4. The image reading apparatus according to claim 1, wherein the acceleration control is started when a rear edge of the sheet has passed through a conveying nip of the first conveyance roller pair.

5. The image reading apparatus according to claim 1, wherein the reader is configured to read a position of the image on the sheet.

6. The image reading apparatus according to claim 1, further comprising a color measuring section that measures a color of the image formed on the sheet that has passed through the conveying nip of the first conveyance roller pair.

7. The image reading apparatus according to claim 6, wherein the second conveyance roller is disposed upstream of a color measuring position of the color measuring second in a conveying direction of the sheet.

8. The image reading apparatus according to claim 6, wherein at least three of the second conveyance roller pairs are provided on the downstream side of the first conveyance roller pair, and at least one of the at least three of the second conveyance roller pairs is disposed upstream of a color measuring position of the color measuring second in a conveying direction of the sheet.

9. The image reading apparatus according to claim 1, wherein a plurality of the second conveyance roller pairs are provided.

10. The image reading apparatus according to claim 1, wherein the second conveyance roller pair is configured so that the sheet reaches the second conveyance roller pair after passing through the first conveyance roller pair.

11. The image reading apparatus according to claim 10, wherein at least three of the second conveyance roller pairs are provided on the downstream side of the first conveyance roller pair.

12. An image forming system comprising:
an image former that forms an image on the sheet;
the image reading apparatus according to claim 1 to which the sheet on which an image has been formed is conveyed; and
a post-processor to which the sheet whose image has been read is conveyed from the image reading apparatus.

13. The image forming system according to claim 12, wherein the post-processor includes:
a post-processing conveyor that conveys the sheet that has been conveyed from the image reading apparatus; and
a hardware processor that controls the post-processing conveyor so as to perform acceleration control for accelerating a conveying speed of the sheet.

14. The image forming system according to claim 12, wherein the second conveyance roller pair includes a roller that is fixed on a rotation driving shaft via an idling mechanism and that idles through the idling mechanism when the acceleration control is performed, the idling mechanism being able to idle in the conveying direction.

15. The image forming system according to claim 12, further comprising a hardware processor that causes either roller of the second conveyance roller pair to move away from the other roller when the acceleration control is performed.

16. The image forming system according to claim 12, wherein the acceleration control is started when a rear edge of the sheet has passed through a conveying nip of the first conveyance roller pair.

17. The image forming system according to claim 12, wherein the reader is configured to read a position of the image on the sheet.

18. The image forming system according to claim 12, further comprising a color measuring section that measures a color of the image formed on the sheet that has passed through the conveying nip of the first conveyance roller pair.

19. The image forming system according to claim 18, wherein the second conveyance roller is disposed upstream of a color measuring position of the color measuring second in a conveying direction of the sheet.

20. The image forming system according to claim 18, wherein at least three of the second conveyance roller pairs are provided on the downstream side of the first conveyance roller pair, and at least one of the at least three of the second conveyance roller pairs is disposed upstream of a color measuring position of the color measuring second in a conveying direction of the sheet.

21. The image forming system according to claim 12, wherein a plurality of the second conveyance roller pairs are provided.

22. The image forming system according to claim 12, wherein the second conveyance roller pair is configured so that the paper reaches the second conveyance roller pair after passing through the first conveyance roller pair.

23. The image forming system according to claim 22, wherein at least three of the second conveyance roller pairs are provided on the downstream side of the first conveyance roller pair.

* * * * *